Sept. 9, 1924.  B. W. WANDERSEE  1,507,873
FOOT BRAKE CONTROL
Filed March 6, 1924
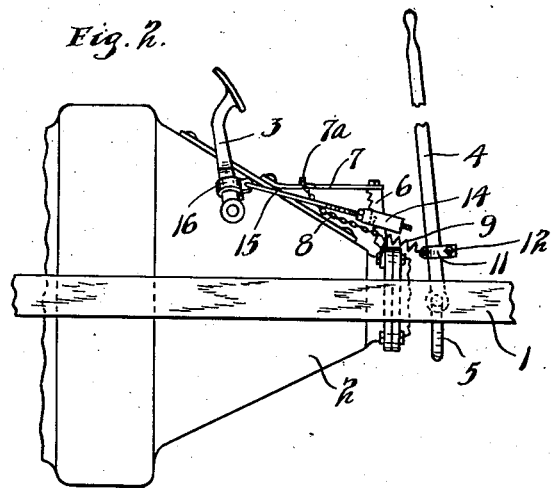
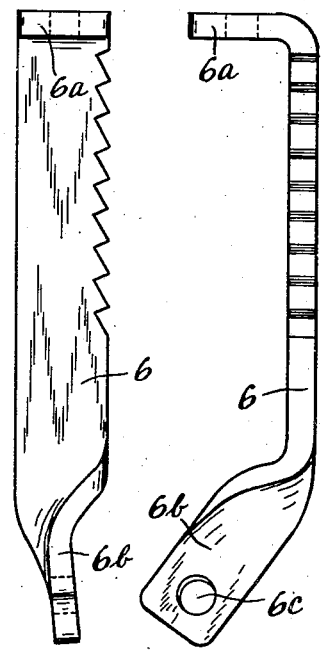
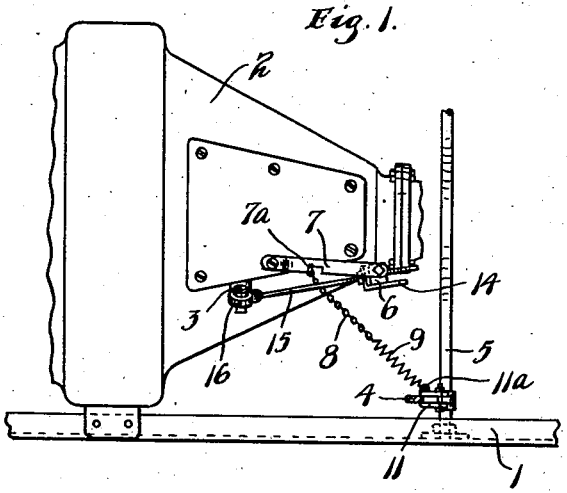
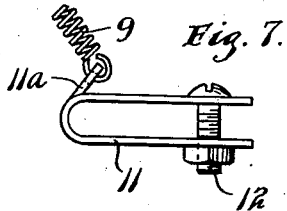
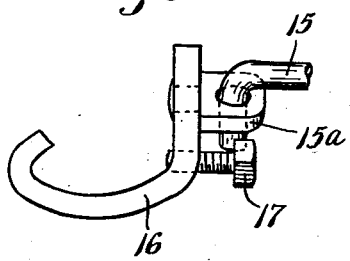
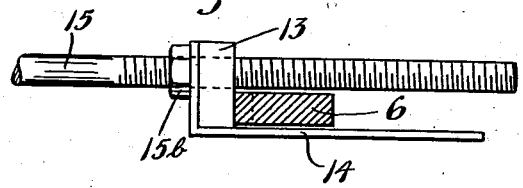
INVENTOR.
BENJAMIN W. WANDERSEE.
BY HIS ATTORNEY.

Patented Sept. 9, 1924.

1,507,873

UNITED STATES PATENT OFFICE.

BENJAMIN W. WANDERSEE, OF MONTROSE, MINNESOTA.

FOOT-BRAKE CONTROL.

Application filed March 6, 1924. Serial No. 697,237.

*To all whom it may concern:*

Be it known that I, BENJAMIN W. WANDERSEE, a citizen of the United States, residing at Montrose, in the county of Wright and State of Minnesota, have invented certain new and useful Improvements in Foot-Brake Control; and I do hereby declare the following to be a full, clear, and exact description of the invention, such as will enable others skilled in the art to which it appertains to make and use the same.

This invention relates to a clutch operating means for an automobile and while the invention may be applied to various other automobiles, it particularly is designed for use with the well known Ford type of automobile. In machines of said type, a brake mechanism is provided operated by a pedal and an emergency brake mechanism is also provided which is usually operated by a lever. In the standard machine, the pedal operated brake is not adapted to be locked in braking position. It sometimes happens that the machine is on such a steep grade or that other conditions exist so that the emergency brake is not sufficient to hold the machine. It is desirable, therefore, to have an additional brake power at such times and it is also desirable to have additional brake power at certain times if the machine is left standing.

It is an object of this invention, therefore, to provide means for holding the pedal operated brake in braking position when the emergency brake is in operation.

It is a further object of the invention to provide a means for holding the pedal operated brake in braking position, which means normally is inoperative, but which is rendered operative by a means controlled by the lever operating the emergency brake so that the locking means for the pedal operated brake will be rendered operative when the emergency brake is in operative position.

These and other objects of the invention will be fully set forth in the following description made in connection with the accompanying drawings in which like reference characters refer to the same parts throughout the different views, and in which Fig. 1 is a plan view of a portion of an automobile showing the device;

Fig. 2 is a view in side elevation of the parts shown in Fig. 1;

Fig. 3 is a view in front elevation of a ratchet bar used;

Fig. 4 is a view in side elevation of said ratchet bar, as seen from the right of Fig. 1;

Fig. 5 is a plan view of a member embracing the pedal lever and one end of a rod connected thereto;

Fig. 6 is a top plan view of a pawl used and the rear part of the rod connecting the same to the pedal lever also showing the ratchet bar in cross section; and Fig. 7 is a top plan view of a yoke adapted to be attached to the emergency brake lever and showing a portion of the spring attached thereto.

Referring to the drawings, one side member of the frame of an automobile is shown as 1, to which is connected and supported thereby the end 2 of the transmission casing, said parts being shown of the type in the well known Ford automobile. The pedal lever for operating the usual pedal operated brake is illustrated as 3 and the lever which operates the emergency brake is shown as 4, said lever being pivoted about the stud or shaft 5 supported at one end by frame 1. The parts thus far described are of the usual construction of the standard Ford car and are all of the parts thereof that it is necessary to consider.

In accordance with the present invention, a ratchet bar 6 is provided having one end $6^a$ bent substantially at a right angle and apertured and having its other end $6^b$ bent laterally and twisted to stand at an angle which end is also provided with aperture or bolt hole $6^c$. Said rack bar 6 is bolted to the front of the flange on the transmission casing 2, as shown in Fig. 2, and an attaching bolt passes through the aperture $6^c$. The ratchet bar 6 thus stands in a substantially vertical position inclining slightly forwardly at its upper end. Another small flat bar 7 is connected at its rear end to the bent portion $6^a$ of the bar 6 and extends forward where it is provided with an upturned end and bolted to the top of the transmission casing 2. Said bar has a lug $7^a$ struck up at one side thereto intermediate its ends to which is connected a flexible member 8 in the form of a small chain which is, in turn, connected to one end of a tension spring 9, said spring being connected at its other end to a yoke or clip 11 clamped to the lower portion of lever 4. Clip 11 merely comprises a U-shaped strip of sheet metal pierced at its ends by a headed and nutted clamping bolt 12 and having a lug 11ª struck up therefrom at its bight end. A pawl 13 in the form of a rectangular block is provided and an angular strip 14 of sheet metal has one side overlying the top of block 13 and its other and longer side extending along and beyond one edge thereof. The parts 13 and 14 are threaded and engaged by the threaded end of a rod 15, a check nut 15ᵇ being also disposed on the threaded end of said rod and arranged to contact the top of plate 14. The rod 15 extends forward over the chain 8 and has its forward end bent downwardly and engaged in a lug 15ª projecting rearwardly from and secured to a hook clamp 16 adapted to embrace the lower portion of pedal lever 3 and to be clamped thereto by a set screw 17.

It will be seen from Fig. 2 that the bar 15 and pawl 13 have their longitudinal axes extending downwardly and the upper rear corner of pawl 13 fits in the teeth in the ratchet bar 6. When the emergency brake lever 4 is in inoperative or forward position, the chain 8 and spring 9 are quite slack and the pawl 13 and bar 15 then drop down at their rear ends so that the pawl 13 does not engage the teeth of ratchet bar 6. It will be seen that the plate 14 extends at one side of ratchet bar 6 forming a guiding means to hold the pawl 13 in proper relation to said bar and this guiding effect is also assisted by the rear end of rod 15 which projects along the other side of ratchet bar 6. When emergency brake lever 4 is in its forward position the pedal lever 3 can be operated as usual to apply or release the pedal operated brake. If the emergency brake lever now be pulled rearwardly to apply the emergency brake, the chain 8 will be pulled quite taut by said lever and spring 9 and the chain will lift the rear end of bar 15 and pawl 13 and bring the same against the teeth of ratchet bar 6. If pedal lever 3 now be moved forwardly to apply the pedal operated brake, it will be held in such forward or brake applying position by the pawl 13 engaging with ratchet bar 6 and will remain in this position until either the emergency lever 4 is moved forward or the pawl is disengaged by hand. The parts, of course, are not readily accessible to be operated by hand and the pedal lever will, therefore, be held in its brake applying position until the emergency lever 4 is released. It is thus seen that when the emergency brake is applied, the pedal operated brake can also be applied and automatically held in applied position so that considerable additional braking power is provided for the machine. It will be seen that the rod 15 can be adjusted in the pawl 13 so that the device can properly be adjusted to correct position when it is installed.

From the above description it is seen that applicant has provided a simple and efficient means for obtaining the additional braking power and holding the pedal operated brake in operative position. The parts of the device are few and simple and can quickly and easily be applied to the standard machine. When once applied, they will operate effectively and require no attention for maintenance. The device has been amply demonstrated in actual practice and found to be very successful and efficient.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. The combination with a Ford or other automobile having a pedal operated brake and an emergency brake, of means for holding said pedal operated brake in braking position when it is operated after said emergency brake is operated, and means for rendering said means operative.

2. The combination with a Ford or other automobile having a pedal operated brake and an emergency brake, of a holding means for retaining said pedal operated brake in braking position, said means normally being in inoperative position, a lever operating said emergency brake, and means controlled by said lever for rendering said first mentioned means operative when said lever is moved to position to apply said emergency brake.

3. The combination with a Ford or other automobile having a pedal operated brake and an emergency brake, of a ratchet bar, a pawl connected to the pedal of said pedal operated brake normally disposed in inoperative relation to said rack bar, a lever for operating said emergency brake and means connected to said lever and pawl adapted to move said pawl into operative relation to said ratchet bar whereby when said brake pedal is operated after said lever said pedal will be held in brake applied position.

4. The combination with a Ford or other automobile having a pedal operated brake and an emergency brake, of a ratchet bar secured to the transmission casing, a bar extending from the top of said bar and also connected to said casing, a pawl adapted to co-operate with said ratchet bar but normally in inoperative position, guiding means for maintaining said pawl alined with said ratchet bar, a connection between said pawl and brake pedal, a lever for operating said emergency brake, and a flexible means connected to the said second mentioned bar extending under said connection and connected to said lever whereby when said lever is moved to brake applying position, said pawl will be brought into operative position to said ratchet bar by said flexible member acting on said connection and said pedal will be held in brake applying position when moved thereto.

5. The structure set forth in claim 4, said connection of said pawl to said pedal lever being adjustable, and a resilient means interposed in said flexible member.

In testimony whereof I affix my signature.

BENJAMIN W. WANDERSEE.